United States Patent
Oda

(10) Patent No.: US 7,710,484 B2
(45) Date of Patent: May 4, 2010

(54) DRIVING METHOD FOR CCD IMAGE SENSOR, AND IMAGING METHOD

(75) Inventor: Kazuya Oda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 967 days.

(21) Appl. No.: 11/482,830

(22) Filed: Jul. 10, 2006

(65) Prior Publication Data

US 2007/0019092 A1   Jan. 25, 2007

(30) Foreign Application Priority Data

Jul. 11, 2005   (JP) .............................. 2005-202239

(51) Int. Cl.
*H04N 5/335* (2006.01)
(52) U.S. Cl. .................. 348/320; 348/315; 348/316; 348/297; 348/311
(58) Field of Classification Search ................. 348/320, 348/322, 315, 316, 297, 241–250, 311
See application file for complete search history.

(56) References Cited

U.S. PATENT DOCUMENTS

| 5,283,451 A | * | 2/1994 | Cazaux | ....................... 257/229 |
| 6,541,805 B1 | * | 4/2003 | Suzuki | ........................ 257/232 |
| 2004/0196393 A1 | * | 10/2004 | Nakata et al. | ................ 348/241 |

FOREIGN PATENT DOCUMENTS

| JP | 2003-069903 | * | 7/2003 |
| JP | 2003-264736 A | | 9/2003 |

\* cited by examiner

*Primary Examiner*—Jason Chan
*Assistant Examiner*—Joel Fosselman
(74) *Attorney, Agent, or Firm*—Birch, Stewart, Kolasch & Birch, LLP

(57) ABSTRACT

A CCD image sensor is driven in an interlace scan method, in which readout of signal charge is performed in two divided fields. In the first field, signal charge Qs accumulated in photodiodes of the first horizontal line and noise charge Qn generated in VCCDs on the second horizontal line are transferred. In the second field, the signal charge Qs accumulated in the photodiodes of the second horizontal line and the noise charge Qn generated in the VCCDs on the first horizontal line are transferred. The image signal based on the noise charge Qn obtained in the second field is subtracted from the image signal Qs based on the signal charge obtained in the first field. Then the image signal based on the noise charge Qn obtained in the first field is subtracted from the image signal based on the signal charge Qs obtained in the second field.

6 Claims, 9 Drawing Sheets

DRIVING METHOD FOR CCD IMAGE SENSOR, AND IMAGING METHOD

BACKGROUND OF THE INVENTION

1. Field of the Invention

The present invention relates to a driving method for a CCD image sensor and an imaging method with use of the CCD image sensor, and more particularly to a driving method for a CCD image sensor and an imaging method in which noise correction is effectively performed.

2. Description Related to the Prior Art

A CCD image sensor is well known as a solid-state imaging device included in a digital camera, a camera phone or the like. The CCD image sensor comprises photoelectric conversion elements (photodiodes) arranged in a two-dimensional matrix to convert entering light into signal charge based on the amount of light and to accumulate the signal charge, a plurality of vertical CCDs provided for respective vertical lines of the photoelectric conversion elements to vertically transfer the signal charge, a horizontal CCD to horizontally transfer the signal charge received from the vertical CCDs, and an output circuit to convert the signal charge received from the horizontal CCD into image signal based on the charge quantity and to output the image signal.

In the CCD image sensor, a specific noise so-called smear is caused. The smear is resulted from undesired electric charge getting into the vertical CCD. The smear works as a dark-current noise (an offset to an appropriate black level) which changes a black level of whole of the obtained image. To solve this problem, Japanese patent laid-open publication 2003-264736 discloses a method to obtain correction data (the dark-current noise) for correcting the black level.

However, in the method of Japanese patent laid-open publication 2003-264736, the data obtaining correction is performed separately from the image capturing operation, and therefore extra time is needed. Accordingly, a time lag is caused in image capturing. Although the time lag does not affect a long time exposure, it becomes a problem in a continuous shooting and so on.

SUMMARY OF THE INVENTION

An object of the present invention is to provide a driving method for a CCD image sensor and an imaging method which enables to effectively obtain correction data for correcting noise caused in a vertical CCD.

In order to achieve the above object and other objects, the CCD image sensor driving method of the present invention employs an interlace scan method in which a first field readout and a second field readout are performed. In addition, plural photoelectric conversion elements are divided into odd horizontal lines and even horizontal lines. In the first field readout, signal charge read out from the photoelectric conversion elements of the odd horizontal lines to the vertical CCDs and noise charge generated in the vertical CCDs on the even horizontal lines are transferred by the vertical CCDs. Then in the second field readout, signal charge read out from the photoelectric conversion elements of the even horizontal lines to the vertical CCDs and noise charge generated in the vertical CCDs on the odd horizontal lines are transferred by the vertical CCDs.

In the imaging method of the present invention with use of this CCD image sensor, in the first field readout, first signal charge read out from the photoelectric conversion elements of the odd horizontal lines to the vertical CCDs and first noise charge generated in the vertical CCDs on the even horizontal lines are transferred by the vertical CCDs and then transferred by the horizontal CCD to be output as image signals from the CCD image sensor. In the second field readout, second signal charge read out from the photoelectric conversion elements of the even horizontal lines to the vertical CCDs and second noise charge generated in the vertical CCDs on the odd horizontal lines are transferred by the vertical CCDs and then transferred by the horizontal CCD to be output as image signals from the CCD image sensor. Then the image signal based on the second noise charge is subtracted from the image signal based on the first signal charge, and the image signal based on the first noise charge is subtracted from the image signal based on the second signal charge.

It is preferable that the CCD image sensor can change ISO sensitivity, and performs the interlace scan when the ISO sensitivity is at least a predetermined value.

Based on the CCD image sensor driving method of the present invention, the signal charge read out from the photoelectric conversion elements of the odd horizontal lines to the vertical CCDs and noise charge generated in the vertical CCDs on the even horizontal lines are transferred by the vertical CCDs in the first field readout, and then the signal charge read out from the photoelectric conversion elements of the even horizontal line to the vertical CCDs and noise charge generated in the vertical CCDs on the odd horizontal line are transferred by the vertical CCDs in the second field readout. Accordingly, the image signal based on the noise charge can be obtained concurrently with the image signal based on the signal charge. Therefore, the correction data for correcting the noise caused in the vertical CCDs can be effectively obtained.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
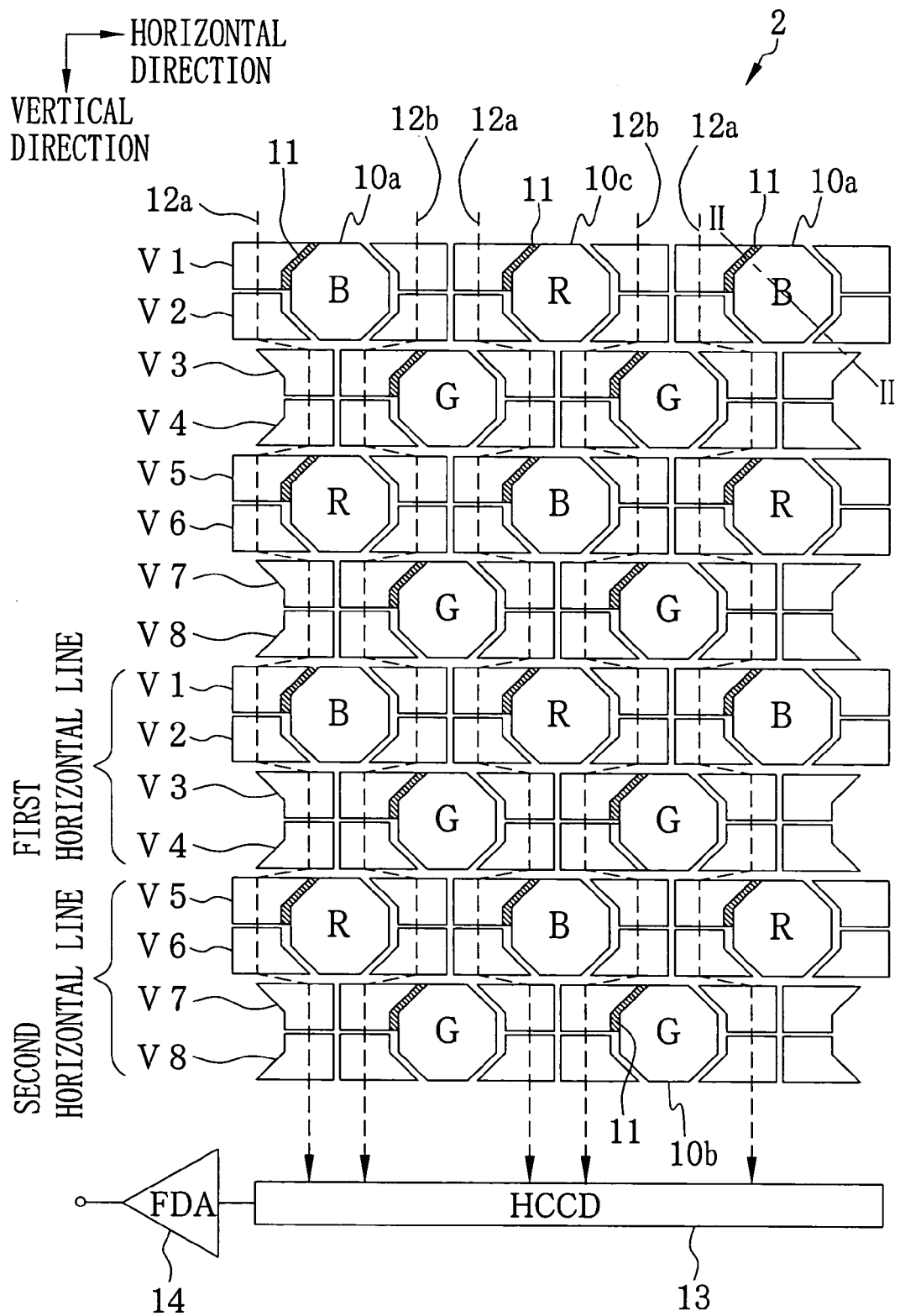
FIG. 1 is a schematic view showing a configuration of a CCD image sensor.

In FIG. 1, a CCD image sensor 2 is an interline-transfer type. In the CCD image sensor 2, there are blue color pixels 10a, green color pixels 10b and red color pixels 10c which have octagonal shape and are arranged in a two-dimensional honeycomb at a regular pitch. About the vertical direction and the horizontal direction, there are lines of alternating arrangement of the blue color pixel 10a and the red color pixel 10c, and lines of the green color pixels 10b. These two kinds of lines are alternatively arranged. The blue color pixel 10a comprises a blue color filter 24 and a microlens 25 (see FIG. 2) which are arranged on a photodiode (hereinafter called as the PD) 10, to generate signal charge based on the amount of entered blue light and to accumulate the signal charge. The green color pixel 10b comprises a green color filter and a microlens which are arranged on the PD 10, to generate signal charge based on the amount of green light and to accumulate the signal charge. The red color pixel 10c generates signal charge based on the amount of red light and accumulates the signal charge.

A vertical CCD (hereinafter called as the VCCD) is provided for each vertical line of the pixels 10a to 10c to transfer the signal charge accumulated in the pixels 10a to 10c in the vertical direction. In FIG. 1, the approximate center of the VCCD is shown by dotted lines. As the VCCD, there are two kinds, one of which is a VCCD 12a connected to the blue color pixels 10a and the red color pixels 10c through readout gates 11, and the other is a VCCD 12b connected to the green color pixels 10b through the readout gates 11. The VCCDs 12a and the VCCDs 12b are alternatively arranged about the horizontal direction. Each of the VCCDs 12a and 12b has first to eighth transfer electrodes V1 to V8 extending in the horizontal direction. The first to fourth transfer electrodes V1 to V4 form a first horizontal line (odd horizontal line), and the fifth to eighth transfer electrodes V5 to V8 form a second horizontal line (even transfer line). Each of the first and second horizontal lines includes the line of alternating arrangement of the blue color pixels 10a and the red color pixels 10c and the line of the green color pixels 10b.

A horizontal CCD (hereinafter called as the HCCD) 13 is connected to the VCCDs 12a and 12b, to horizontally transfer the signal charge of one line transferred from the plural VCCDs 12a and 12b, toward a floating diffusion amplifier (hereinafter called as the FDA) 14. The FDA 14 constitutes an output circuit to convert the charge into signal voltage (image signal) and to output the image signal.

The VCCDs 12a and 12b receives the signal charge from the pixels 10a to 10c through the readout gates 11, and then sequentially transfers them in the downward direction. The VCCDs 12a and 12b can perform both the interlace scan (field readout) and a progressive scan (frame readout). In the interlace scan, at first the signal charge in the pixels 10a to 10c of the first horizontal line are read out and transferred vertically and horizontally, and then the signal charge in the pixels 10a to 10c of the second horizontal line are read out. In the progressive scan, the signal charge in the pixels 10a to 10c of all of the horizontal lines are read out concurrently and transferred vertically and horizontally, without distinction between the first and second horizontal lines.

The readout gate 11 is provided between each of the pixels 10a to 10c and each of the VCCDs 12a and 12b, and controlled by the first transfer electrode V1, the third transfer electrode V3, the fifth transfer electrode V5 and the seventh transfer electrode V7. The transfer electrodes V1, V3, V5 and V7 are used to control both the readout operation of the readout gates 11 and the transfer operation of the VCCDs 12a and 12b. Note that the readout of the signal charge from each of the pixels 10a to 10c to each of the VCCDs 12a and 12b through the readout gate 11 is operated by applying predetermined high voltage to the transfer electrodes V1, V3, V5 and V7.

The HCCD 13 is connected to one end of each of the VCCDs 12a and 12b. The HCCD 13 receives the signal charge from each of the VCCDs 12a and 12b and serially transfers them to the FDA 14.

Figure 2:
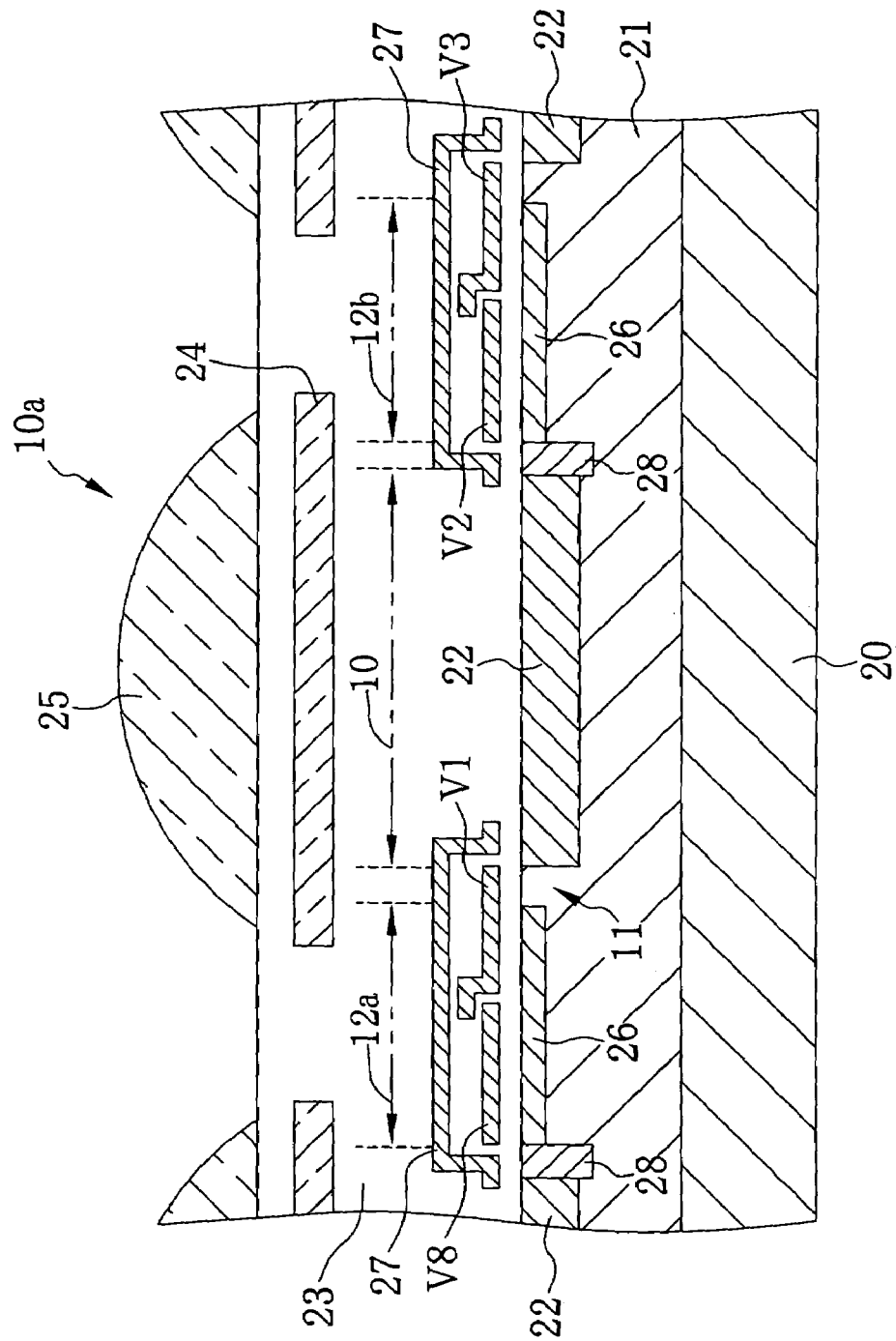
FIG. 2 is a vertical cross-sectional view along II-II line in FIG. 1.
Figure 3A:
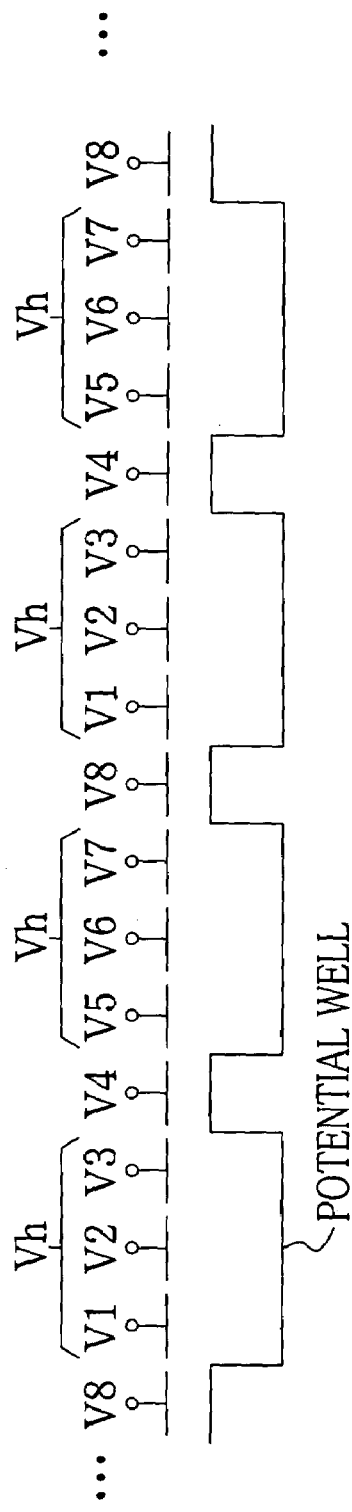
FIG. 3A and FIG. 3B are potential drawings which explain readout of electric charge in a first field.
Figure 3B:
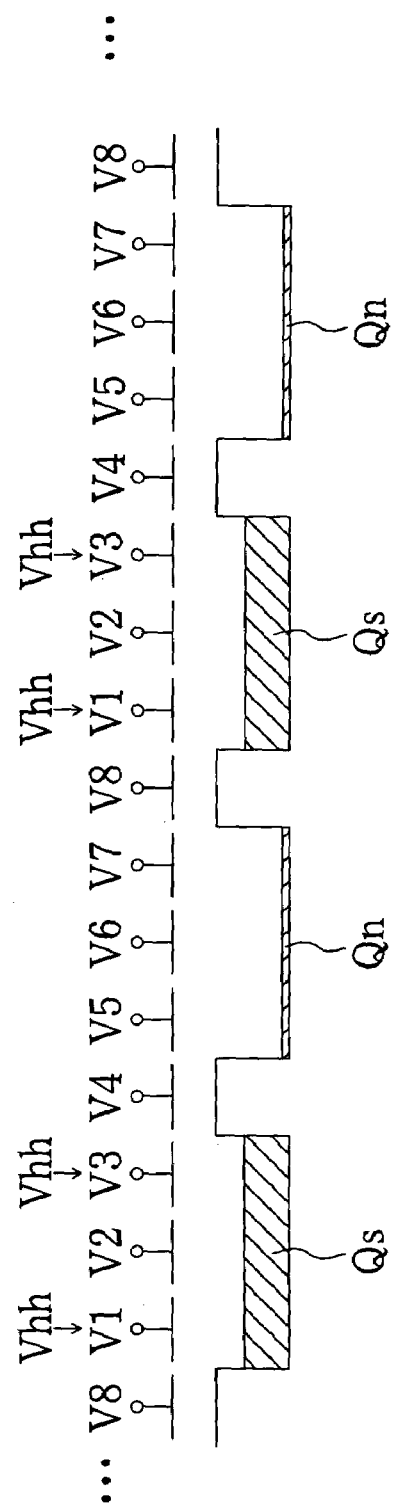

With reference to FIG. 2, concrete structures of the PD 10, the readout gate 11, and the VCCDs 12a and 12b will be described. A p-type well 21 is formed on an n-type semiconductor substrate 20, and an n-type layer 22 is formed on a surface of the p-type well 21. The p-type well 21 and the n-type layer 22 constitute the PD 10. Above the n-type layer 22, a color filter 24 and microlens 25 are formed through a planarizing layer 23 of BPSG or the like.

On the surface of the p-type well 21, further an n-type layer 26 is formed with keeping away from the n-type layer 22. Above the n-type layer 26, the transfer electrodes V1 to V8 (the transfer electrodes V4 to V7 are not shown in this figure) of polysilicon are formed. This area functions as the VCCDs 12a and 12b. Above the n-type layer 26 and the transfer electrodes V1 to V8, a light shielding film 27 is formed.

The n-type layer 26 and the n-type layer 22 are electrically separated each other by the p-type well 21 or a p+ layer 28. Above the p-type well 21 in between the n-type layer 26 and the n-type layer 22 is covered by the transfer electrode V1, V3, V5, or V7. This area functions as the readout gate 11. The $p^+$ layer 28 functions as a channel stop.

When subject light is entered into the PD 10 through the microlens 25 and the color filter 24, electron-hole pairs are generated in a joint area of the n-type layer 22 and the p-type well 21, thus the electrons are accumulated in the n-type layer 22 as the signal charge. When a predetermined positive high voltage is applied to the transfer electrodes V1, V3, V5 and V7, barrier potential to the electron in the readout gate 11 is reduced. Accordingly, the electrons accumulated in the n-type layer 22 are transferred to the n-type layer 26. The electrons read out by the n-type layer 26 are vertically transferred by voltage control of the transfer electrodes V1 to V8.

Next, with reference to FIG. 3 to FIG. 8, a transfer method for electric charge in the CCD image sensor 2 is described. The signal charge accumulated in the PDs 10 based on the entry of the subject light are transferred by the interlace scan in two divided fields. In the first field, as shown in FIG. 3A, a first voltage Vh is applied to the transfer electrodes V1 to V3 and V5 to V7 to form potential wells to the signal charge, in the VCCDs 12a and 12b of the transfer electrodes V1 to V3 and V5 to V7. In this state, a voltage Vhh (Vhh>Vh) is applied to the transfer electrodes V1 and V3. Accordingly, as shown in FIG. 3B, the signal charge Qs are read out from the PDs 10 of the first horizontal lines to the VCCDs 12a and 12b, and are accumulated in the potential wells under the transfer electrodes V1 to V3. At this time, noise charge Qn (dark-current noise) are accumulated in the potential wells under the transfer electrodes V5 to V7.

Figure 4:
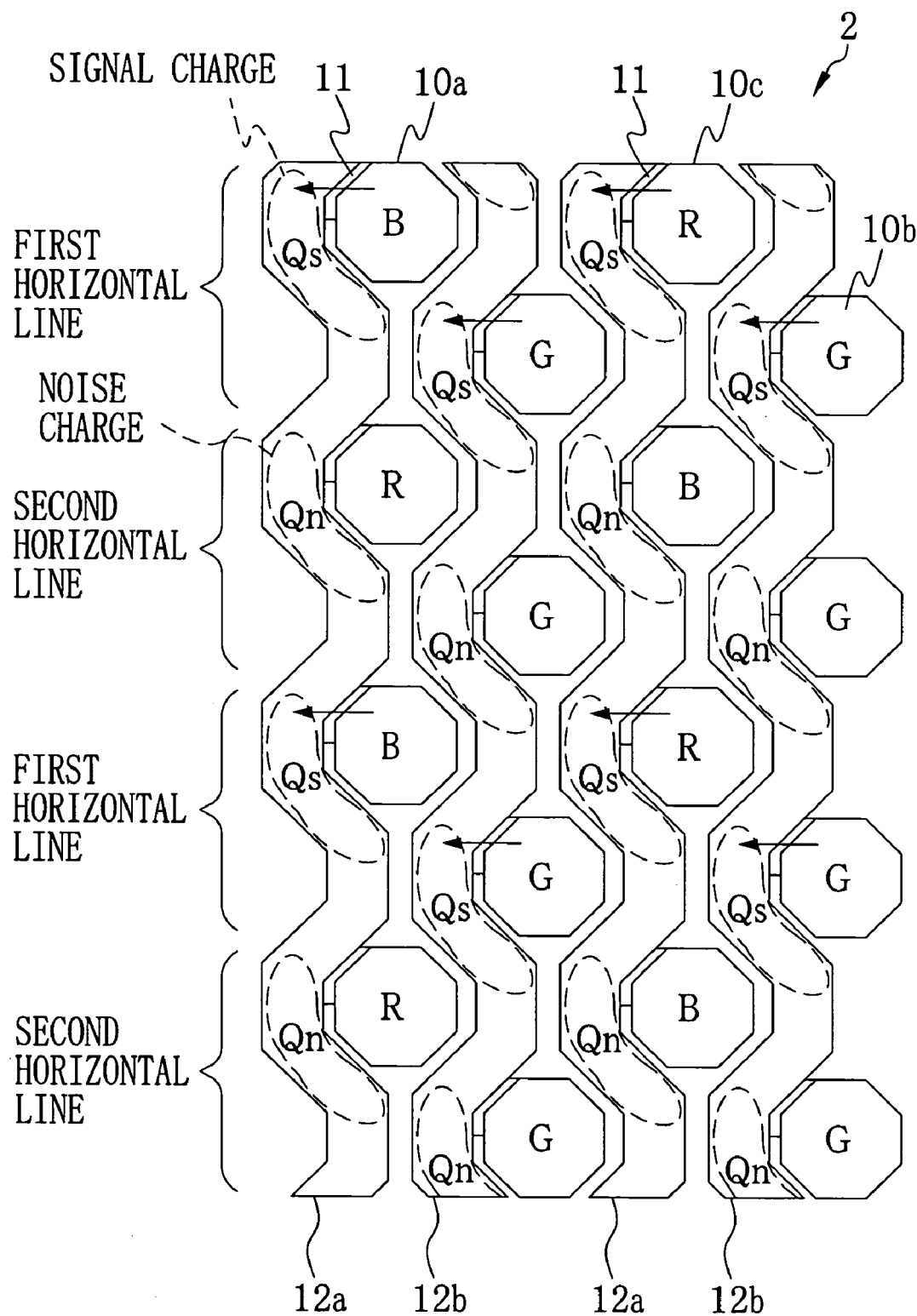
FIG. 4 is an explanatory view showing positions of the electric charge read out in the first field.
Figure 5:
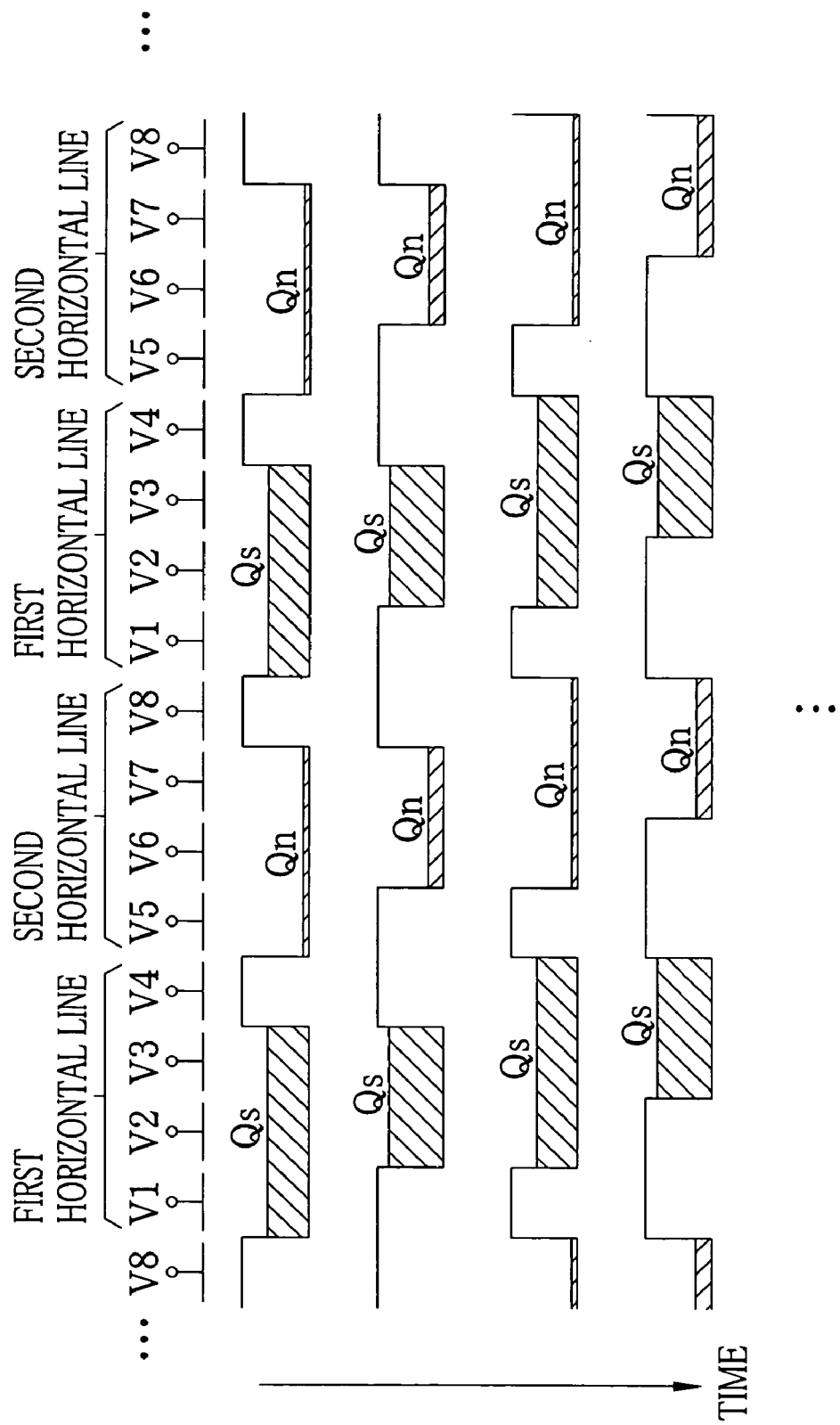
FIG. 5 is a potential drawing which explains transfer of the electric charge in the first field.

In the state that the signal charge Qs are in the VCCDs 12a and 12b of the first horizontal lines and the noise charge Qn are in the VCCDs 12a and 12b of the second horizontal lines as shown in FIG. 4, vertical transfer pulses are applied to the transfer electrodes V1 to V8. Accordingly, as shown in FIG. 5, the signal charge Qs and the noise charge Qn accumulated alternately in the VCCDs 12a and 12b are sequentially transferred to the HCCD 13. Then horizontal transfer pulses are applied to the HCCD 13 to sequentially transfer the signal charge Qs and the noise charge Qn to the FDA 14. The FDA 14 outputs image signals based on the signal charge Qs, and the image signals based on the noise charge Qn.

Figure 6A:
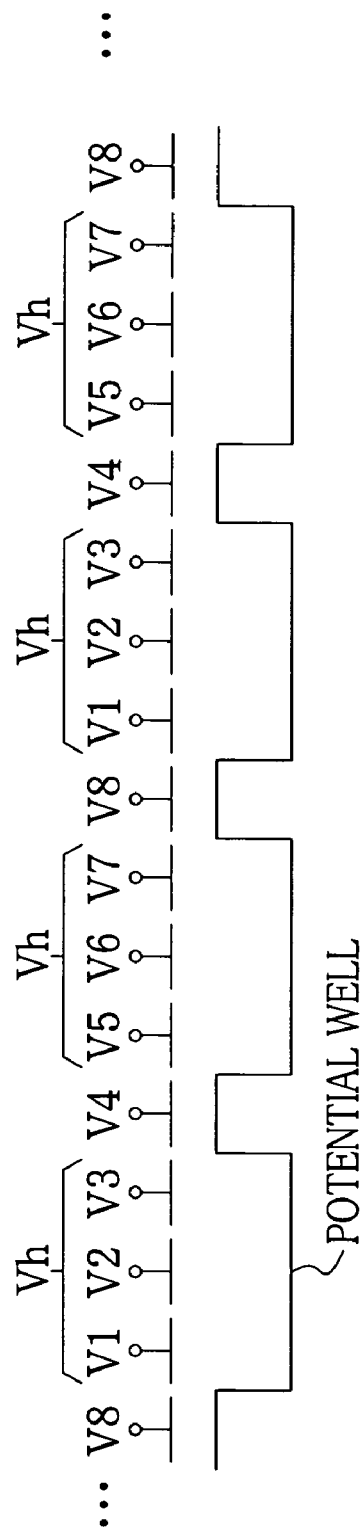
FIG. 6A and FIG. 6B are potential drawings which explain readout of the electric charge in a second field.
Figure 6B:
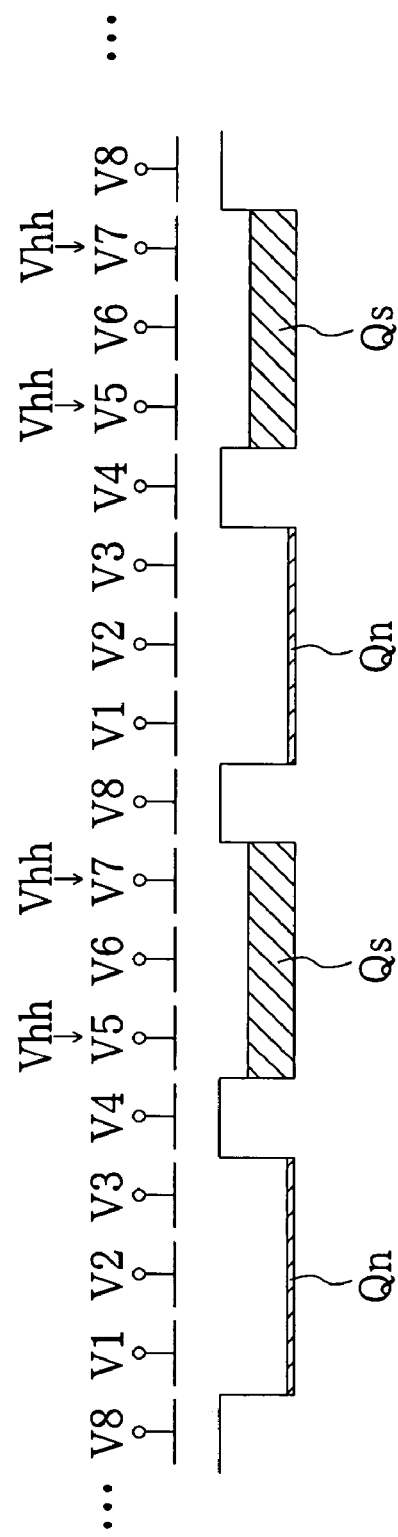

In the second field, as shown in FIG. 6A, a first voltage Vh is applied to the transfer electrodes V1 to V3 and V5 to V7, to form potential wells in the VCCDs 12a and 12b to the signal charge. In this state, a voltage Vhh is applied to the transfer electrodes V5 and V7. Accordingly, as shown in FIG. 6B, the signal charge Qs are read out from the PDs 10 under the second horizontal lines to the VCCDs 12a and 12b, and are accumulated in the potential wells under the transfer electrodes V5 to V7. At this time, noise charge Qn are accumulated in the potential wells under the transfer electrodes V1 to V3.

Figure 7:
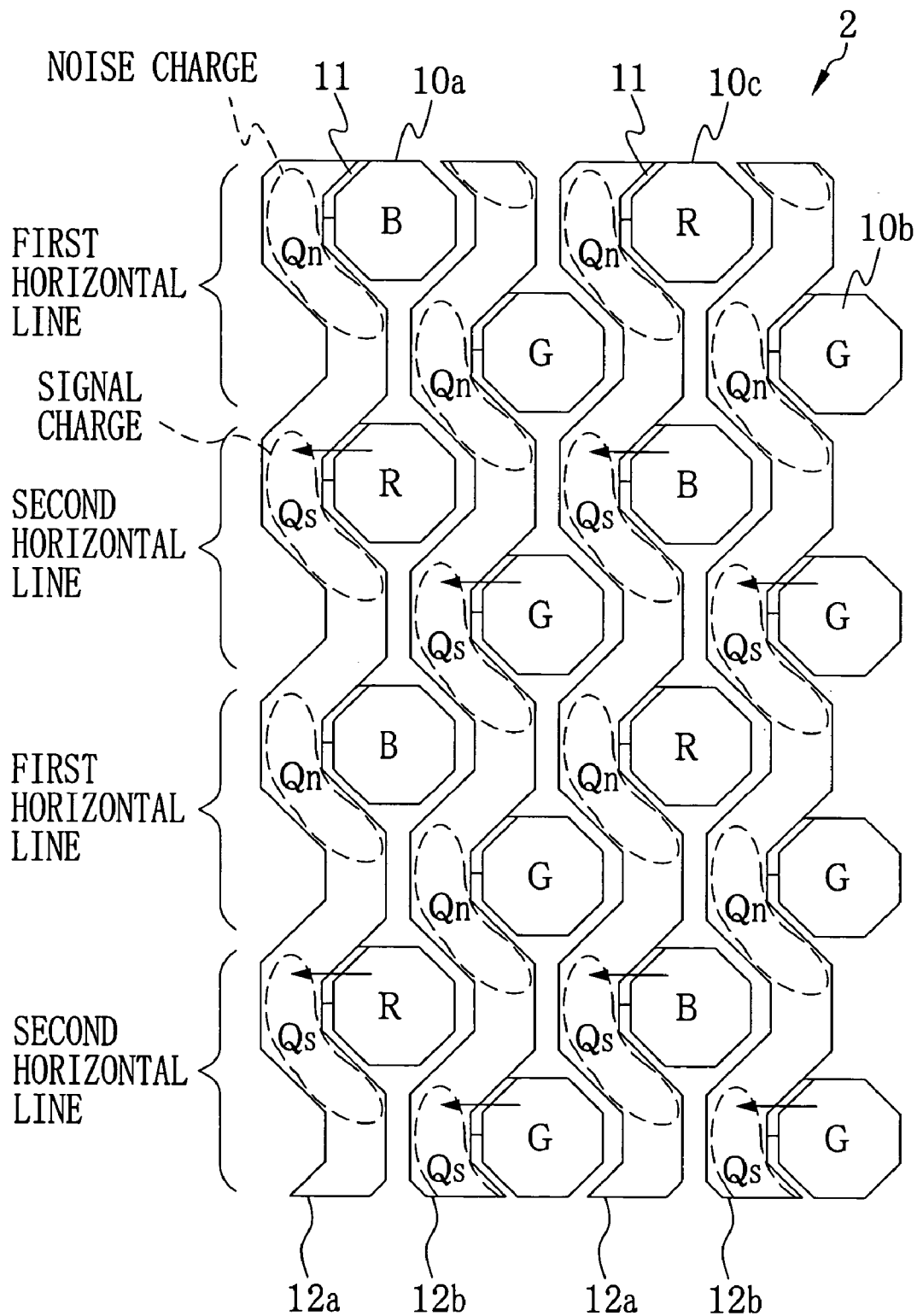
FIG. 7 is an explanatory view showing positions of the electric charge read out in the second field.
Figure 8:
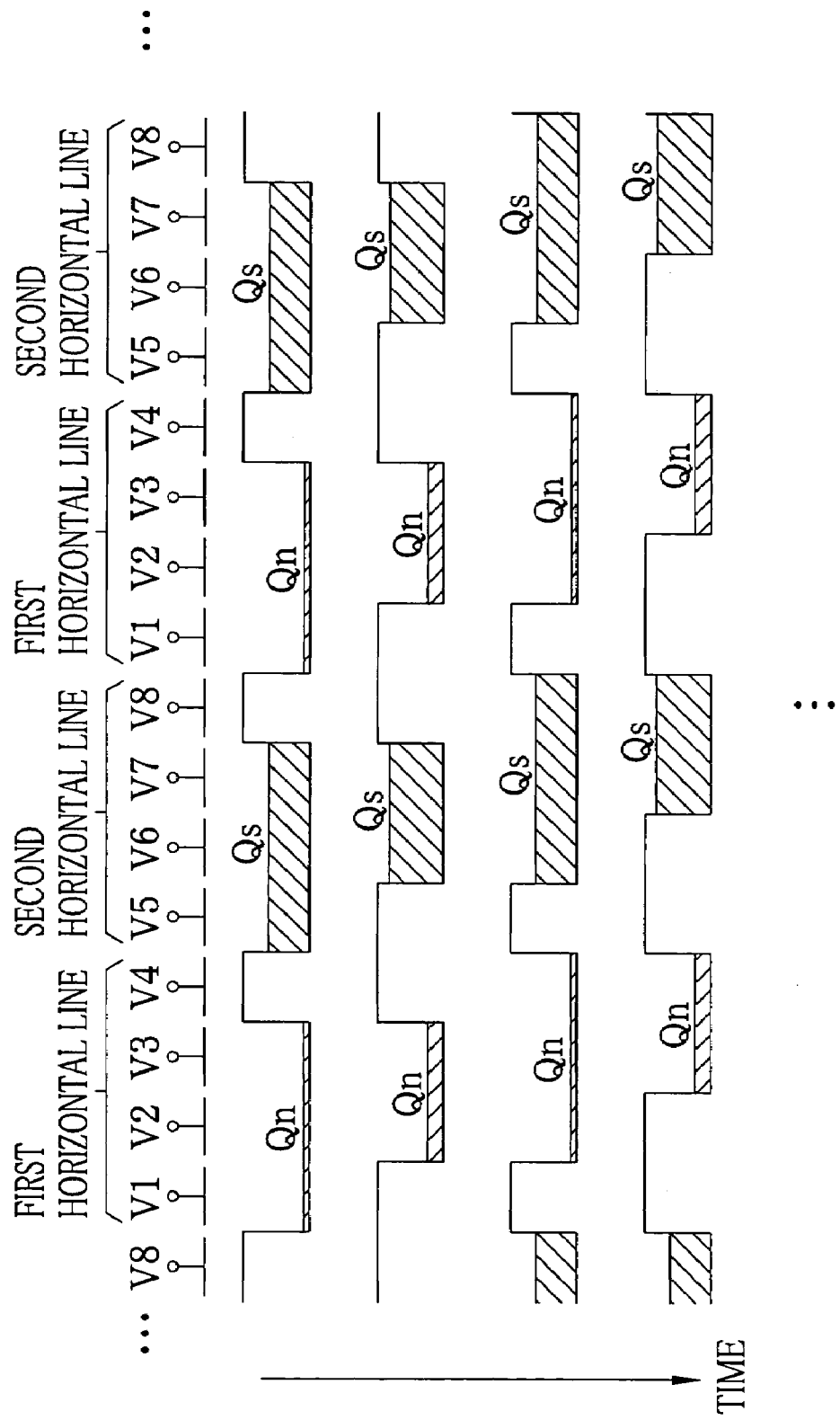
FIG. 8 is a potential drawing which explains transfer of the electric charge in the second field.

In the state that the signal charge Qs are in the VCCDs 12a and 12b of the second horizontal lines and the noise charge Qn are in the VCCDs 12a and 12b of the first horizontal lines as shown in FIG. 7, vertical transfer pulses are applied to the transfer electrodes V1 to V8. Accordingly, as shown in FIG. 8, the signal charge Qs and the noise charge Qn accumulated alternately in the VCCDs 12a and 12b are sequentially transferred to the HCCD 13. Then horizontal transfer pulses are applied to the HCCD 13 to sequentially transfer the signal charge Qs and the noise charge Qn to the FDA 14. The FDA 14 outputs image signals based on the signal charge Qs, and the image signals based on the noise charge Qn.

Since the CCD image sensor 2 is driven in the above-described manner, in both the first and second fields, the image signal based on the noise charge (correction data for correcting black level due to the VCCDs 12a and 12b) can be obtained concurrently with the image signal based on the signal charge. Accordingly, additional time to obtain the correction data is not required.

Figure 9:
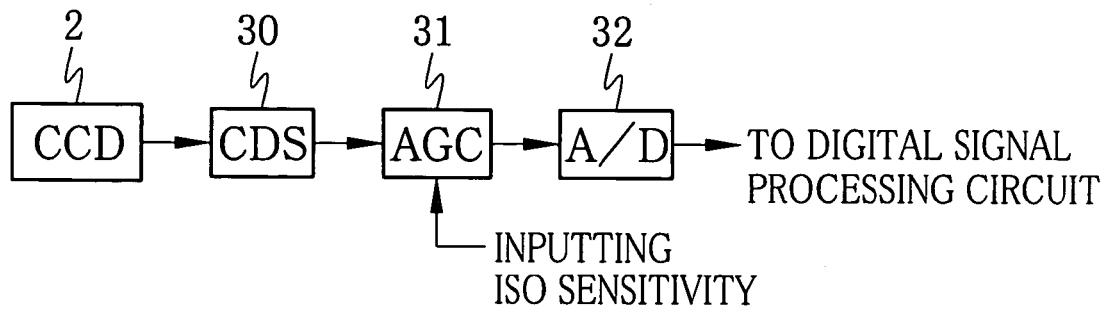
FIG. 9 is a block diagram showing an analog signal processing circuit in a digital camera.

As shown in FIG. 9, in a digital camera (imaging apparatus) having the CCD image sensor 2, there is an analog signal processor comprising a correlated double sampling circuit (CDS) 30, an auto gain control amplifier (AGC) 31 and an A/D converter 32. The CDS 30 removes amplifier noises and reset noises from the image signals output from the CCD image sensor 2. The AGC 31 is a signal amplifier with programmable gain control. When an ISO sensitivity is input through an operating section (not shown) into the AGC 31, the AGC 31 sets the gain value based on the ISO sensitivity. The A/D converter 32 converts the analog image signal into digital signal. The digitized image signal (RAW data) is transmitted to a digital signal processing circuit, subject to specific image processing and then recorded as the image data in a memory.

Figure 10:
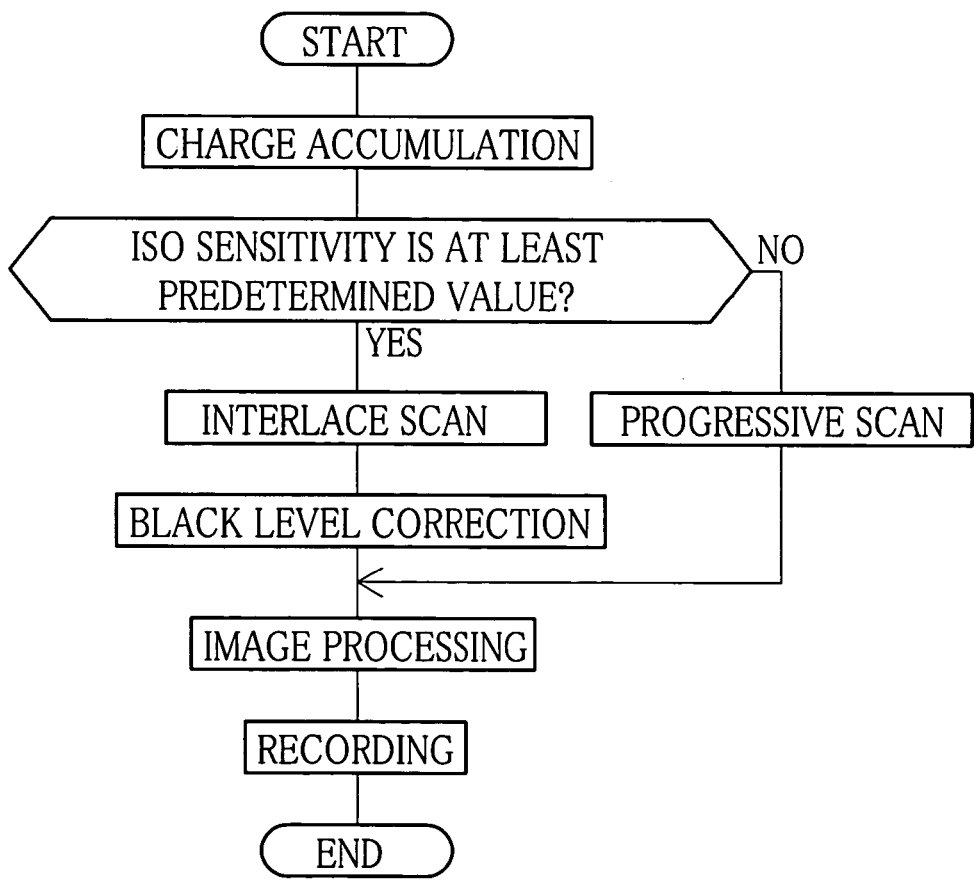
FIG. 10 is a flowchart showing an imaging operation of the digital camera of FIG. 9.

As shown in a flowchart of FIG. 10, the operation of the CCD image sensor 2 is changed based on the ISO sensitivity. When the ISO sensitivity is at least a predetermined value (for example ISO 800), the above-described interlace scan shown in FIG. 3 to FIG. 8 is performed after the charge accumulation of the PDs 10. After that, a black level correction is performed. In the black level correction, the obtained image signal based on the noise charge is subtracted from the obtained image signal based on the signal charge.

The black level correction is performed in the digital signal processing circuit. At first, the image signal based on the noise charge obtained in the second field is subtracted from the image signal based on the signal charge obtained in the first field. Then the image signal based on the noise charge obtained in the first field is subtracted from the image signal based on the signal charge obtained in the second field. In contrast, when the ISO sensitivity is less than the predetermined value, the progressive scan is performed. In the progressive scan, the signal charge in all of the PDs 10 are concurrently read out and transferred in vertical and horizontal direction, without distinction between the first and second horizontal lines. Through this process, only the image signal is obtained.

The interlace scan requires longer processing time than that for the progressive scan. Accordingly, in the above embodiment, the interlace scan is performed only when the ISO sensitivity is at high value in which the black level variation becomes large. In this configuration, image taking operation of the digital camera becomes more efficient. Note that in the low-ISO sensitivity state, a field readout in which two pixels arranged in the vertical direction are combined may be performed instead of the progressive scan.

Although the readout gates 11 are arranged to be controlled by the transfer electrodes V1, V3, V5 and V7 as shown in FIG. 1 in the above embodiment, the arrangement of the readout gates 11 is not limited to above and may be changed.

Although the pixels 10a to 10c are arranged in the honeycomb as shown in FIG. 1 in the above embodiment, they may be arranged in a matrix as well known.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging method with use of a CCD image sensor which employs an interlace scan method in which a first field readout and a second field readout are performed, said CCD image sensor comprising plural photoelectric conversion elements arranged in two-dimensions, plural vertical CCDs arranged for every vertical line of said photoelectric conversion elements to transfer electric charge in the vertical direction and a horizontal CCD to transfer said electric charge of one horizontal line received from said plural vertical CCDs in the horizontal direction, said imaging method comprising:

dividing said plural photoelectric conversion elements into odd horizontal lines and even horizontal lines;

said first field readout, in which first signal charge read out from said photoelectric conversion elements of said odd horizontal lines to said vertical CCDs and first noise charge generated in said vertical CCDs on said even horizontal lines are transferred by said vertical CCDs and then transferred by said horizontal CCD to be output as imaging signals from said CCD image sensor;

said second field readout, in which second signal charge read out from said photoelectric conversion elements of said even horizontal lines to said vertical CCDs and second noise charge generated in said vertical CCDs on said odd horizontal lines are transferred by said vertical CCDs and then transferred by said horizontal CCD to be output as imaging signals from said CCD image sensor; and subtracting said image signal based on said second noise charge from said image signal based on said first signal charge, and subtracting said image signal based on said first noise charge from said image signal based on said second signal charge wherein said vertical CCD on said odd horizontal line includes first to fourth transfer electrodes, and said vertical CCD on said even horizontal line includes fifth to eighth transfer electrodes wherein said first field readout step including processes of:

applying voltage Vh to said first to third and fifth to seventh transfer electrodes to form potential wells to said signal chargeaid potential wells being formed in said vertical CCDs under said first to third and fifth to seventh transfer electrodes;

applying voltage Vhh (Vhh>Vh) to said first and third transfer electrodes when said potential wells are formed, to accumulate said signal charge in said potential wells under said first to third transfer electrodes, and said noise charge in said potential wells under said fifth to seventh transfer electrodes; and transferring said signal charge and noise charge concurrently in the vertical direction by said vertical CCDs and transferring said signal charge and noise charge concurrently in the horizontal direction by said horizontal CCD.

2. An imaging method claimed in claim 1, wherein said photoelectric conversion elements have photodiodes and are arranged in a honeycomb fashion at a regular pitch.

3. An imaging method claimed in claim 2, wherein each of said odd and even horizontal lines includes a line of alternating arrangement of said photodiodes for photoelectric conversion of red light and said photodiodes for photoelectric conversion of blue light and a line of said photodiodes for photoelectric conversion of green light.

4. An imaging method claimed in claim 1, wherein said second field readout step including processes of:

applying voltage Vh to said first to third and fifth to seventh transfer electrodes to form potential wells to said signal chargeaid potential wells being formed in said vertical CCDs under said first to third and fifth to seventh transfer electrodes;

applying voltage Vhh (Vhh>Vh) to said fifth and seventh transfer electrodes when said potential wells are formed, to accumulate said signal charge in said potential wells under said fifth to seventh transfer electrodes, and said noise charge in said potential wells under said first to third transfer electrodes; and transferring said signal charge and noise charge concurrently in the vertical direction by said vertical CCDs and in the horizontal direction by said horizontal CCD.

5. An imaging method claimed in claim 1, wherein said CCD image sensor can change ISO sensitivity, and performs said interlace scan when said ISO sensitivity is at least a predetermined value.

6. An imaging method claimed in claim 5, wherein said CCD image sensor performs a progressive scan in which signal charge in all of photoelectric conversion elements are read out concurrently, when said ISO sensitivity is less than said predetermined value.

* * * * *